(12) United States Patent
Morris (10) Patent No.: US 9,364,124 B2
(45) Date of Patent: Jun. 14, 2016

(54) WATERLESS TOILET SYSTEM AND METHODS OF USE

(71) Applicant: Elizabeth Morris, Carrboro, NC (US)

(72) Inventor: Elizabeth Morris, Carrboro, NC (US)

(73) Assignee: Sanitation Creations, LLC, Carrboro, NC (US)

( * ) Notice: Subject to any disclaimer, the term of this patent is extended or adjusted under 35 U.S.C. 154(b) by 578 days.

(21) Appl. No.: 13/772,112

(22) Filed: Feb. 20, 2013

(65) Prior Publication Data

US 2013/0212796 A1  Aug. 22, 2013

Related U.S. Application Data

(60) Provisional application No. 61/600,747, filed on Feb. 20, 2012.

(51) Int. Cl.
*A47K 11/06* (2006.01)
*A47K 11/02* (2006.01)

(52) U.S. Cl.
CPC .............. *A47K 11/06* (2013.01); *A47K 11/026* (2013.01)

(58) Field of Classification Search
CPC ....................................................... A47K 11/06
USPC ............................................. 4/474, 479, 484
See application file for complete search history.

(56) References Cited

U.S. PATENT DOCUMENTS

| | | | |
|---|---|---|---|
| 2,671,906 | A | 3/1954 | Pott |
| 3,401,409 | A | 9/1968 | Ekrut |
| 3,452,368 | A | 7/1969 | Couper |
| 3,648,302 | A | 3/1972 | Winters |
| 3,665,522 | A | 5/1972 | Backlund et al. |
| 3,693,193 | A | 9/1972 | May |
| 3,746,159 | A | 7/1973 | May |
| 5,058,218 | A | 10/1991 | Lobbert |
| 5,960,487 | A | 10/1999 | Hawkins et al. |
| 6,052,842 | A | 4/2000 | He |
| 6,212,701 | B1 | 4/2001 | He |
| 6,931,684 | B1 | 8/2005 | Henegar |
| 7,080,418 | B2 | 7/2006 | Henegar |
| 7,562,400 | B2 | 7/2009 | Graham |
| 7,849,527 | B2 | 12/2010 | Mochizuki et al. |
| 8,122,522 | B2 | 2/2012 | Looft |
| 2005/0278843 | A1 | 12/2005 | Henegar |
| 2006/0037130 | A1 | 2/2006 | Graham |
| 2009/0017526 | A1* | 1/2009 | Strobel et al. .............. 435/256.5 |
| 2009/0165196 | A1 | 7/2009 | Mochizuki et al. |
| 2009/0255045 | A1 | 10/2009 | Sakurai |

FOREIGN PATENT DOCUMENTS

WO  WO2009129638  10/2009
WO  WO2011113164  9/2011

* cited by examiner

*Primary Examiner* — Tuan N Nguyen
(74) *Attorney, Agent, or Firm* — Triangle Patents, PLLC (57) ABSTRACT

An environmentally-friendly portable toilet that is waterless, odorless and cost efficient, that uses specially-lined bags that kill pathogens and are sealed and released into a base section, which is connected to a hard plastic sitting unit, forming an integral, closed system for waterless sanitation.

10 Claims, 8 Drawing Sheets

SECTION B-B

SECTION D-D

Fig. 7

SECTION B-B

WATERLESS TOILET SYSTEM AND METHODS OF USE

CROSS-REFERENCE TO RELATED COPENDING APPLICATIONS

This application claims the benefit of U.S. Provisional Patent Application No. 61/600,747, filed Feb. 20, 2012, entitled "Waterless Toilet System and Methods of Use," which is incorporated herein by reference in its entirety.

BACKGROUND OF THE INVENTION

1. Field of the Invention

The present invention relates to toilet systems, and, more particularly, to waterless portable toilet systems.

2. Description of the Prior Art

Prior art includes portable sanitation systems and methods having waterless disposal of waste. Additionally, it is known in the prior art to include bags for receiving the waste from the toilet device.

U.S. Pat. No. 2,671,906, issued Mar. 16, 1954, invented by Pott, for a liner for sanitary closets, describes a sanitary closet comprising: a bowl with a hole in the bottom; a supply of tubular film around the bowl and extending upwardly; and means of drawing the film downwardly through the bowl. It further describes sealing jaws which are operated by a handle to seal an area of the film on itself, securing the waste in a bag formed by the film, and drawn downwardly through the hole of the bowl.

U.S. Pat. No. 3,401,409, issued Sep. 17, 1968, invented by Ekrut, for a waste disposal unit, describes a unit for sanitary disposal of human waste, especially for use in vehicles such as buses, airplanes, trailers, campers, and the like. The waste disposal unit includes: a housing; means adjacent to the top of the housing for suspending in open-mouth position and impermeable heat-sealable waste-receiving bag of thermoplastic film; spaced apart compression means within the housing moveable for squeezing together the sides of the bag adjacent the open end; heating means for sealing the top squeezed together portion of the bag, and a storage means disposed within housing below the sealing means for receiving sealed bags of waste by gravity.

U.S. Pat. No. 3,452,368, issued on Jul. 1, 1969, invented by Couper, for a portable waste disposer, describes a portable waste dispenser which may be used as a portable toilet which utilizes an elongated plastic bag which is continuously sealed as increments of the bag are passed through the toilet. The seal mechanism includes two pairs of elongated rubber rollers spring-biased together and the amount of elongated plastic tubing that is included in the dispenser is determined by the desired number of "flushes".

U.S. Pat. No. 3,648,302, issued on Mar. 14, 1972, invented by Winters, for a portable waterless water closet, describes a portable waterless water closet in which the waste materials are sealed off and stored for subsequent removal in a disposable bag stored in a magazine beneath the seat. The water closet includes a mechanism that grasps and pulls successive lengths of the bag from the magazine while also providing a double seal to isolate waste materials in the storage compartment from the unused portion of the bag.

U.S. Pat. No. 3,665,522, issued on May 30, 1972, invented by Pactosan et al., for an apparatus for collecting solid or liquid wastes, describes a toilet apparatus for collecting solid or liquid wastes in which one sealed end of a hose of thin, tight, flexible material is adapted to be passed down into a container for receiving the waste. A sealing mechanism comprising welding jaws that press a portion of the hose between them and seal the hose at that position by welding.

U.S. Pat. Nos. 3,693,193 and 3,746,159, issued on Sep. 26, 1972 and Jul. 17, 1973 respectively, for a portable sanitary toilet and for a cartridge package for a sanitary toilet respectively, each invented by May, describe a portable toilet which collects waste in an elongated tube-like plastic bag and further describes a pair of pincher arms below the toilet seat that pinch the opposite sides of the tube together to form an odor-tight seal. The bag is advanced into the waste chamber through depression of a foot crank. The '159 patent describes a cartridge package containing the elongated plastic bag for the sanitary toilet.

U.S. Pat. No. 5,058,218, issued Oct. 22, 1991, invented by Lobbert, for a waterless toilet, describes a waterless toilet for use with containers that accommodate waste and can be sealed tight, including: a seat having multiple depressions, each depression accommodating one container; and means for rotating the seat such that the depressions assume different positions—a first position with a magazine of unused containers and a mechanism for dispensing a container into each depression, a second position at which the toilet can be used, a third position with a magazine that supplies lids for sealing the used containers and a mechanism for dispensing lids to each container, and a fourth position with means for removing a container from each depression and forwarding the container to a waste depot.

U.S. Pat. No. 5,960,487, issued on Oct. 5, 1999, invented by Hawkins et al., for a dry toilet, describes a dry toilet that uses a substantially continuous sheet of disposable bowl lining material to convey the toilet waste out of the toilet bowl for disposal and an apparatus for holding, advancing, separating, and releasing successive portions of the lining sheet.

U.S. Pat. Nos. 6,052,842 and 6,212,701, issued May 16, 2000 and Apr. 10, 2001 respectively, and WIPO Pub. No. WO1997027795, each invented by He, for a waterless closet assembly, comprises: a closet having an inlet and an outlet; an annular seat disposed over the inlet of the closet; a tubular hose having a first portion disposed exteriorly of the closet and a second portion extending upwardly over the annular seat and downwardly through the outlet of the closet; and advancing means for advancing the hose upwardly over the annular seat and downwardly through the closet. Furthermore, these documents describe the advancing means comprising a pair of rollers to pull the tubular hose downwardly and clamping plates to clamp the tubular hose. The '701 patent further describes an automatic dry toilet that has a pedal for controlling the open-closed pulling mechanism.

U.S. Pat. Nos. 6,931,684 and 7,080,418, issued Aug. 23, 2005 and Jul. 25, 2006 respectively, for a bed or wheelchair having an integral refuse disposal system, each invented by Henegar, describe a refuse disposal systems comprising: a seat member; an annular well holding an annular cartridge of compressed disposable tubing positioned within the annular well; and disposable tubing extending upwardly from the cartridge over the seat member and downwardly through the seat's opening. After use, the fresh tubular material is pulled from the cartridge and the waste is tied off or sealed in the used portion of the tubular material.

U.S. Pat. No. 7,562,400, issued on Jul. 21, 2009, invented by Graham, for mobile equipment for non-ambulatory people, describes a commode adapted to assist non-ambulatory person to independently access said commode, the commode comprising: a dispenser of tubes adapted to provide a tube within a basin to receive and enclose the waste products; a lower baffle that is capable of clamping an open top of the tube after receiving the waste products; and a cutting tool to cut individual bags from the tube.

U.S. Pat. No. 7,849,527, issued on Dec. 14, 2010, invented by Nochizuki et al., for a toilet apparatus with processing material, describes a toilet apparatus comprising: a packaging member comprising a long, flexible and folded continuous cylindrical member set in position surrounding the toilet bowl and below the toilet seat, the packaging member being adapted to receive excrement produced by the user and subsequently sealed at an opening thereof and transferred downward in the toilet bowl; processing material for absorbing liquid and semi-solidifying the excrement; a mechanism to feed processing material into the packaging member alongside the excrement; and a sensor to automatically supply the processing material into the bowl when the user sits on the toilet seat or stands up from the toilet seat.

US Pub. No. 20090255045, published Oct. 15, 2009, invented by Sakurai, for excretion packaging type portable toilet apparatus, describes an excretion packaging portable toilet adapted for: packing excretion produced at a time into a flexible bag-like container; hermetically sealing the pack; and dropping the pack into a storage section under the main toilet body.

PCT Pub. No. WO2009129638, published Oct. 29, 2009, invented by Luscher et al., for a water-free toilet system, describes a toilet device comprising: a toilet seat; a film tube for collection of waste; a closing device below the toilet seat for using a shutter to close a bag from the film tube at certain intervals; and a conveyor system for moving closed bags to a collection container.

PCT Pub. No. WO2011113164, published Sep. 22, 2011, invented by Luscher et al., for a waterless toilet system, describes a toilet device comprising: a seat; a film tube under the seat, provided for receiving products of human excretion and closed on one end; means for closing the film tube to form a closed bag; and means for detaching the closed bag to produce once again a film tube that is closed at one end. This publication further describes a catching device for receiving detached closed bags.

SUMMARY OF THE INVENTION

The present invention relates to portable sanitation. It is an object of this invention to provide an environmentally-friendly portable toilet that is waterless, odorless and cost efficient, that uses specially-lined bags that kill pathogens and are sealed and released into a base section, the base section being connected to a hard plastic sitting unit, forming an integral, closed system for waterless sanitation.

Yet another object of this invention is to provide methods for using the waterless, odorless toilet device and/or system of the present invention.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 8A-8F generally illustrate a series of views of components of the present invention.

FIG. 8E shows an end view of components of the present invention.

FIG. 8F shows a top view of components of the present invention.

DETAILED DESCRIPTION

Referring now to the drawings in general, the illustrations are for the purpose of describing a preferred embodiment of the invention and are not intended to limit the invention thereto.

The present invention provides systems and methods for waterless sanitation, including an environmentally-friendly portable toilet that is waterless, odorless and cost efficient, that uses specially-lined bags that kill pathogens and are sealed and released into a base section, which is connected to a hard plastic sitting unit, forming an integral, closed system for waterless sanitation.

In one embodiment of the present invention, a waterless sanitation system is provided that includes a base section enclosing bags for receiving waste through an opening in a sitting unit, connected to and positioned above the base section.

As shown in the figures, various views are provided of one embodiment of the invention, namely the apparatus and its components including a sitting unit or seat member, attached to a base unit, wherein the base unit further includes and houses waste receiving bags, and the base unit is further attached to a storage bin (not shown), all of which are retrofittable to existing portable toilets, while no longer requiring a pit or hole for receiving waste from users, and eliminating the odor associated with waterless toilets.

Figure 1:
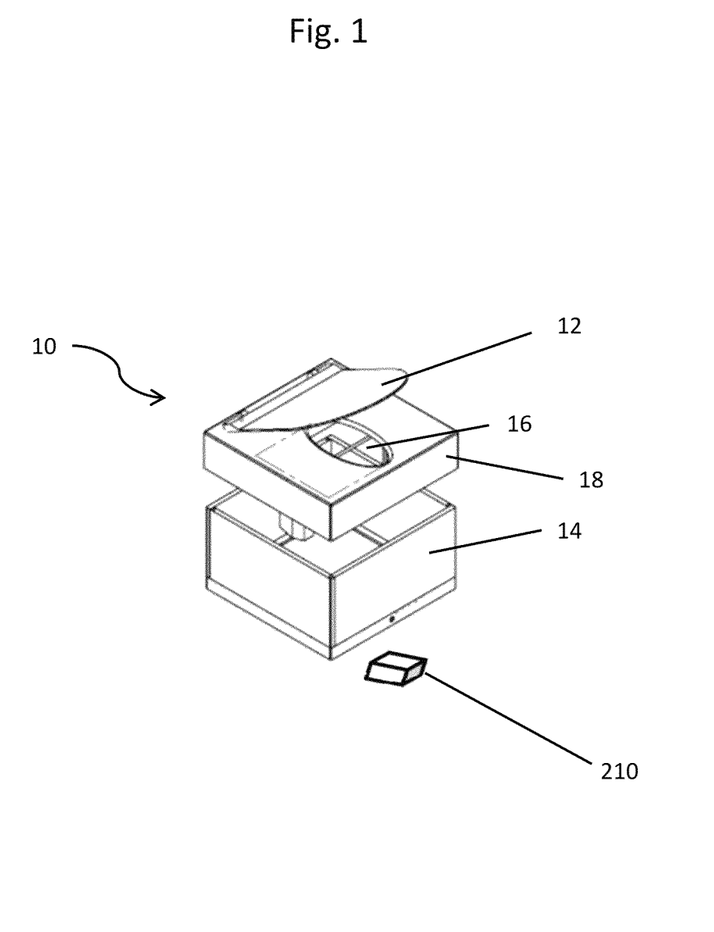
FIG. 1 is a perspective view diagram showing exploded views of the main components of one embodiment of the invention.
Figure 2:
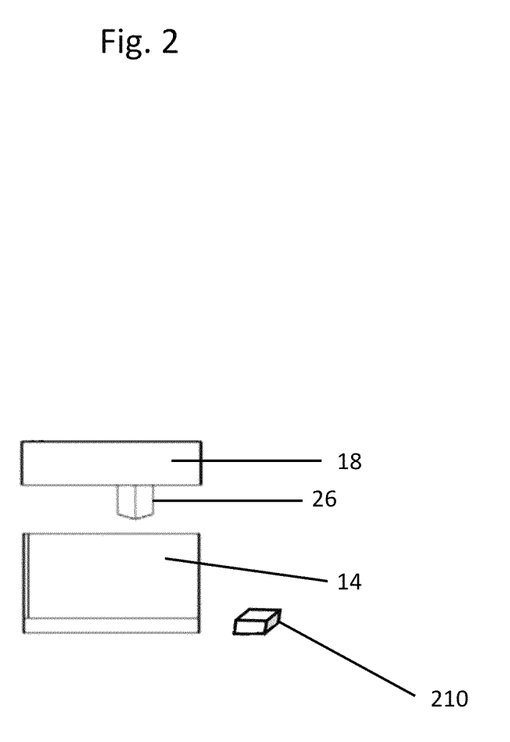
FIG. 2 is a side view diagram of the invention of FIG. 1, showing the lid in an open position and the base unit separated from the seating unit.
Figure 3:
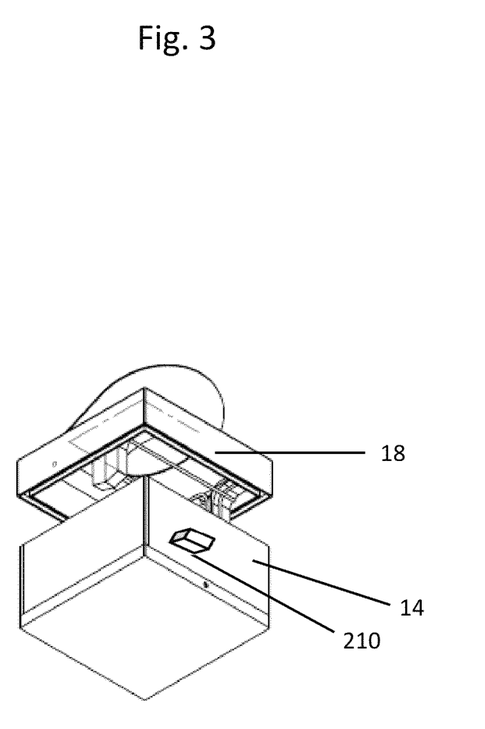
FIG. 3 is a perspective view diagram from a lower view showing exploded views of the main components of one embodiment of the invention shown in FIG. 1.
Figure 4:
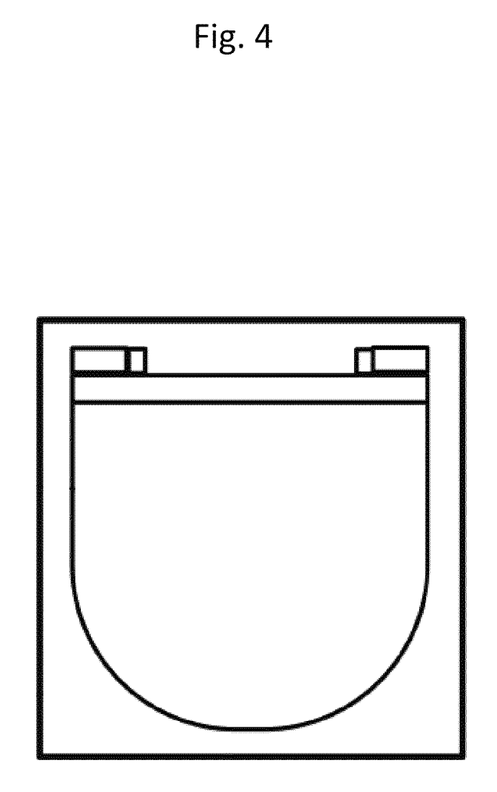
FIG. 4 is a top view diagram of the invention of FIG. 1.
Figure 5:
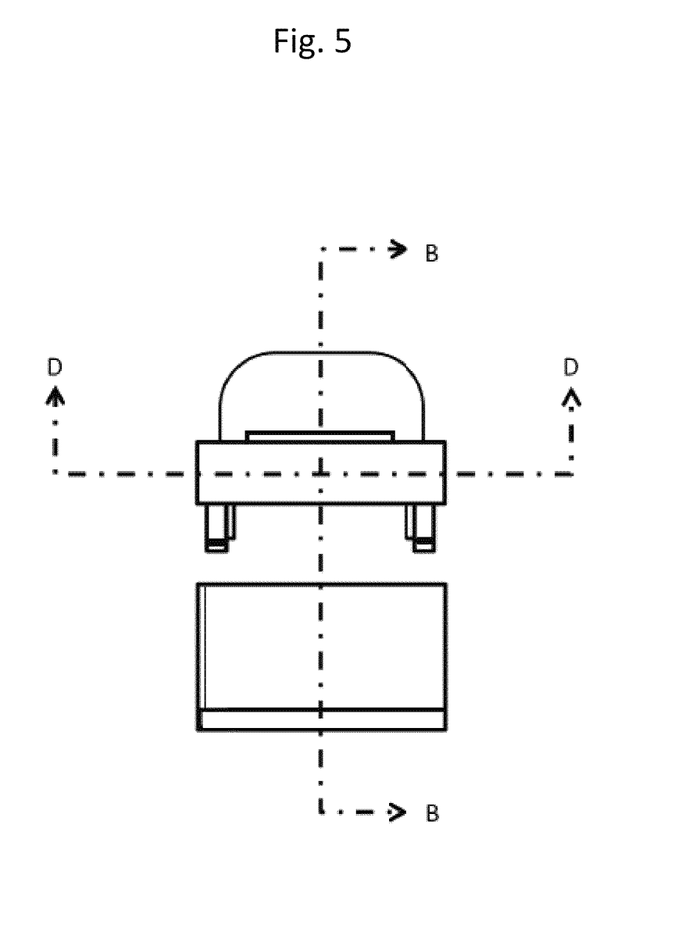
FIG. 5 is a front view diagram of the invention of FIG. 1.
Figure 6:
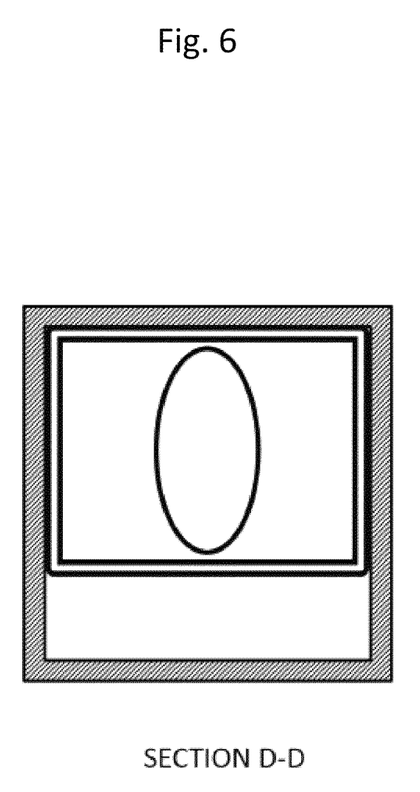
FIG. 6 is a bottom sectional view diagram of FIG. 1 along line D-D.
Figure 7:
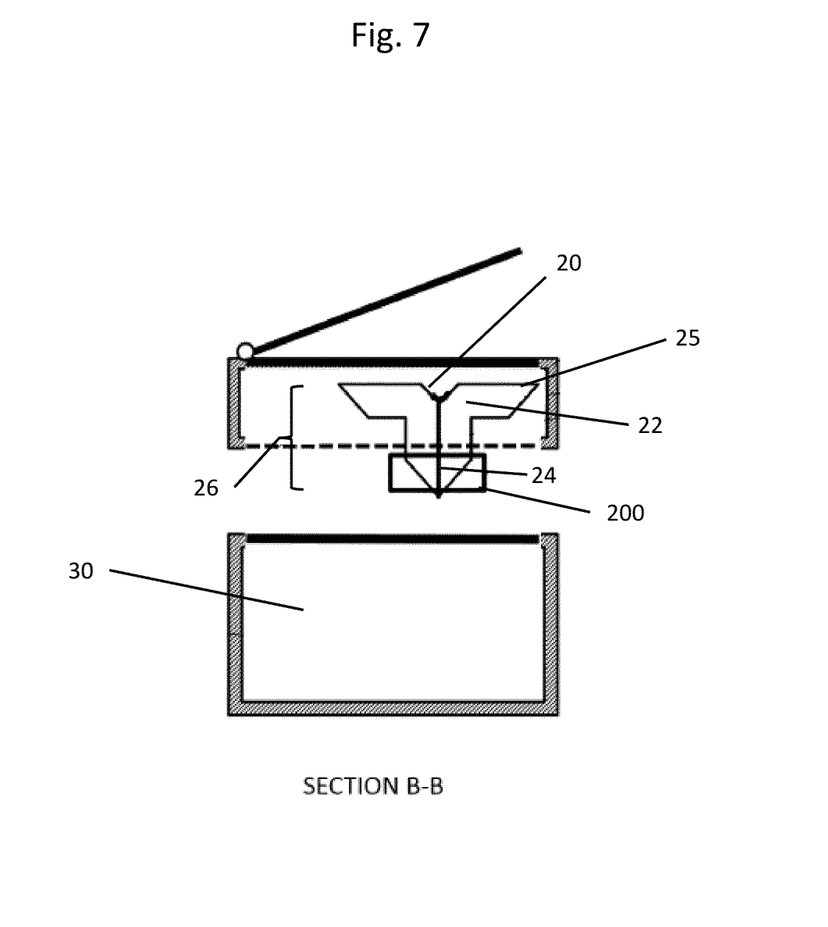
FIG. 7 is a side sectional view diagram of the invention of FIG. 1 along line D-D.
Figure 8A:
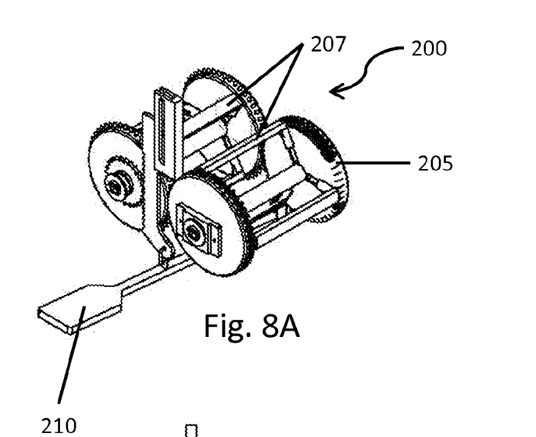
FIG. 8A shows a top perspective view of components of the present invention.
Figure 8B:
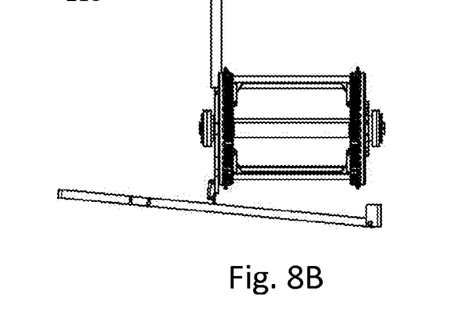
FIG. 8B shows a side view of components of the present invention.
Figure 8C:
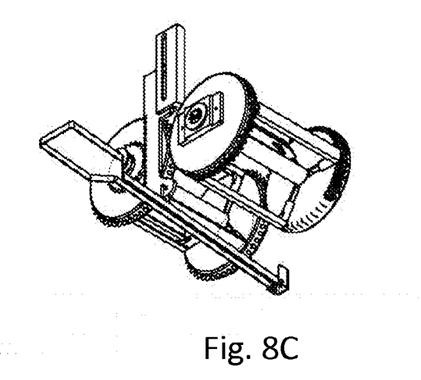
FIG. 8C shows a bottom perspective view of components of the present invention.
Figure 8D:
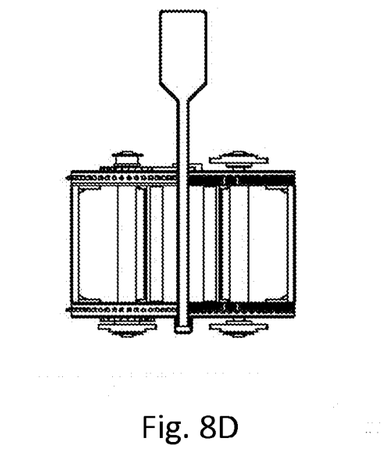
FIG. 8D shows a bottom view of components of the present invention.
Figure 8E:
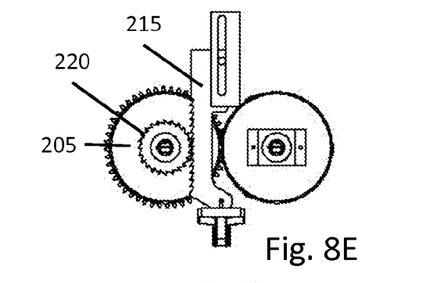
Figure 8F:
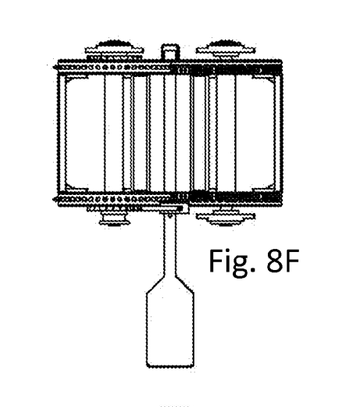

More specifically, FIG. 1 is a perspective view diagram showing exploded views of the main components of one embodiment of the invention. FIG. 2 is a side view diagram of the invention of FIG. 1, showing the lid in an open position and the base unit separated from the seating unit. FIG. 3 is a perspective view diagram from a lower view showing exploded views of the main components of one embodiment of the invention shown in FIG. 1. FIG. 4 is a top view diagram of the invention of FIG. 1. FIG. 5 is a front view diagram of the invention of FIG. 1. FIG. 6 is a bottom sectional view diagram of FIG. 1 along line D-D. FIG. 7 is a side sectional view diagram of the invention of FIG. 1 along line D-D.

The system is a closed-looped system to collect excreta through a toilet seat and base apparatus that is retrofittable for existing portable toilets (port-a-potties). B by way of example and not limitation, the system may be used as a stand-alone unit for an alternative toilet for the transportation industry, may have application in mobile home trailers, campers, boats, and the like, or may have application for use in developing countries where plumbing systems are not available or water supplies are limited.

In a preferred embodiment, the system includes a sitting unit or seat member that is attached to a base unit, wherein the base unit further includes and houses waste receiving bags, and the base unit is further attached to a storage bin. In preferred embodiments, the sitting unit is formed of hard plastic and is pivotally connected to the base unit. Preferably, the bags are specially lined bags that include chemicals or enzymes that help to treat the excreta. A sealing mechanism is used to close and seal the bag after it is full of excreta, before a release mechanism functions to release and/or drop it into the storage bin, thus limiting smell and making it easy to empty. The hard plastic sitting unit has two main components: a bottom holding tank; and a top unit that contains a sealing mechanism. The bottom holding tank fits together using male and female pieces to form a cube for holding the bags. The holding tank is lined with a biodegradable garbage bag to allow for containment of the filled bags and for easy closure and emptying. In a method for using the invention, the bags are then collected or removed from the holding tank. Preferably, the waste output is turned into bio-gas using gasification or fertilizer using composting.

As illustrated in the drawings, particularly FIGS. 1-7, the top unit, generally described as 10, includes a lid 12 that functions like a standard toilet lid, moveable between an open and a closed position, such as by a pivoting movement with a front portion of the lid liftable away from the base unit 14. The lid is preferably closed when the toilet is not in use to help prevent odor rising upwardly through the opening 16 in the sitting unit or seat 18. The bags 20 are provided from a bag tube 22 that supplies a multiplicity of bags to the apparatus; the bag tube has a first end 24 that is inserted into the top of the top unit. In one embodiment illustrated by the sections B-B and D-D in the FIGS. 1-7, the sealing mechanism uses three sealing bars 207 on each pair of gears 205 to cinch the bags and push them through to the holding tank. The sealing mechanism is activated by a foot pedal 210 that extends outwardly from the bottom holding tank. The foot pedal is attached to four nylon strings that connect or hook to the sealing mechanism. These strings are disconnectable for emptying the bottom holding tank. The strings are attached to pulleys on either side in the bottom holding tank to activate the sealing mechanism. Alternative mechanisms for attaching the foot pedal to the sealing mechanism are possible and are within the scope of the present invention. For example, plastic rods and elastic bands can be used as the attachment and return mechanism.

More preferably, the present invention provides for a bagging mechanism 26 which includes a bag dispenser, such as a bag cartridge unit 25, and mechanical sealing mechanism, which are illustrated in the drawings of FIGS. 1-7 and FIGS. 8A-8F.

In a preferred embodiment, the present invention provides a closed-loop system for waterless human waste receiving, decontamination, and disposal. The system includes a hard plastic sitting unit having two parts—a bottom holding tank or storage bin or receptacle and a top seat and pivotally connected lid, which is movable between an open and a closed position as illustrated in the FIGS. 1-7. Preferably, the top sitting unit further includes a bagging mechanism 26 that includes a mechanical sealing mechanism and a bag cartridge unit 25 for holding and dispensing a series of clean, unused bags that are connected at their ends and linked after use and sealing by the mechanical sealing mechanism. The bag cartridge unit 25 is positioned below the seat and contains a continuous, antimicrobial-lined plastic sheet tube 22 that is long enough to form about 100 sealed "bags" after each use of the system. The antimicrobial-lined plastic sheet tube that forms bags includes the antimicrobial(s) as additive to the plastic material. By way of example and not limitation, the antimicrobial additive includes urea, which when in contact with water in the excreta produces ammonia automatically and changes the pH within the bags filled with waste; the ammonia kills pathogens in the excreta to decontaminate the waste.

The mechanical sealing mechanism illustrated in FIGS. 8A-8F, generally described as 200, includes four (4) gears 205 connected by sealing bars 207 that extend across the continuous plastic tube. The bars 207 are operable to cinch the plastic to form bags and to push the plastic through the system downwardly toward the storage container or holding tank, as illustrated in FIGS. 1-7. The mechanical sealing mechanism 200 and its four interactive gears 205, connected by sealing rods 207, interact and cooperate to cinch and to seal the continuous tubing to form sealed waste-filled bags when activated, and rotating to advance the continuous tubing and sealed bags downwardly into the receiving container through a top opening therein. Preferably the sealing bars are disconnectable when the bottom holding tank unit needs to be emptied. The mechanical sealing mechanism requires no electricity to function. In a preferred embodiment, the mechanical sealing mechanism is connected to and activated by a foot pedal 210, which protrudes from the bottom of the receiving storage container or holding tank, to provide a waterless faux-flush downward movement of the waste-containing sealed bag into the receiving storage container or holding tank, which is sized to contain about 100 waste-filled bags. The foot pedal has a spring-loaded connection to the mechanical sealing mechanism. The pedal is connected to gearing mechanism, preferably a rack and pinion gearing as shown in FIGS. 8A-8F. The rack or toothed bar 215 turns a pinion or gear 220, which turns the one of the four interactive gears 205. The pinion is designed to freewheel with respect to the interactive gear on the return movement so as not to reverse the direction of the sealed bag. Advantageously, the mechanical sealing mechanism provides that no human handling of or contact with the waste bags is necessary. The receiving storage container or holding tank has an open top for receiving the waste-filled bags and for easy emptying thereof. Preferably, it is lined with a larger anti-microbial lined bag that encases the about 100 filled bags. When emptied, the waste-filled bags may be disposed or burned for energy.

In preferred embodiments, the bags are specially lined with chemicals for killing pathogens in the waste deposited into the bags. In one embodiment, the bags are lined with urea and other anti-microbials that kill the odor and disease-causing pathogens in the waste. At the top of each bag a glue lining allows for easy sealing by the sealing mechanism. Preferably, the plastic tube would contain enough material to supply a multiplicity of bags, for example, the equivalent of 100 continuous bags. The continuous plastic tube 22, housed within the bag cartridge unit 25, extends outward in each direction, parallel to section D-D (see FIG. 5), then upwards and back inwards so that the tube is positioned below the seat opening 16 and above the sealing mechanism 200. In such a position, the sealing mechanism can engage the plastic tube, advancing it downward and through the cylindrical area of the remaining plastic tube housed within the bag cartridge unit. In an alternative embodiment, the tube is configured so that the plastic tube can be pulled up and around the seat itself to provide a clean space to sit. Upon advancement through the sealing mechanism, which seals the plastic tube into a multiplicity of bags, the bags may remain connected to each other, thereby forming a sausage link as they snake down into the bottom receptacle. In one embodiment, the tube provides adhesive strips (or dots) approximately 8-12 inches apart on the horizontal. In preferred applications, a sealing mechanism applies pressure after use and compresses an adhesive together, thereby sealing the tube into a multiplicity of bags.

In an alternative embodiment, the bags are perforated, so when sealed after use, the used bag drops into the base individually, so that a continuous 'sausage link' is not formed. The weight of the filled used bag provides the force required to pull down the next bag.

Preferably, a single layered bag is used, and also preferably it is a bio-degradable plastic and is lined with Urea and other anti-microbials. When used in methods and systems of the present invention, the Urea mixes with the water in the waste, forms ammonia and makes conditions within the bag too basic for pathogens to exist. The anti-microbials act as deodorizers.

In one embodiment, the waterless toilet system of the present invention is made out of plastic, which enables it to be versatile for the different types of households in developing countries that would use it. By way of example and not limitation, suitable plastic materials are selected from the group consisting of polyethylene terephthalate (PET), polyethylene (PE), polypropylene (PP), polyvinyl chloride (PVC), and derivations or combinations thereof. These suitable plastic materials are durable, versatile, easy to manufacture, and cost-effective. Additionally, the use of a hard plastic material for forming the storage container or holding tank is advantageous because it is waterproof and is easy to mold into different shapes to allow for both sitting and squatting. The present invention is preferably a waterless system for receiving and decontaminating urine and solid waste from human excrement. The present invention is operable to receive a very small amount of additional material associated with the human excrement, e.g., small quantities of used toilet paper, leaves, or small amounts of water, i.e., several milliliters instead of liters of water used with water-based flushing toilets The small quantities of used toilet paper, leaves, and/or small amounts of water used as an anal cleansing method may be disposed of with the excreta and received by the waterless toilet system of the present invention. Additionally, personal waste associated with feminine hygiene, which also requires decontamination as human waste may also be disposed into the system and decontaminated within the active decontamination bags used with the present invention. By way of example and not limitation, feminine hygiene waste may include sanitary napkins, tampons, and other personal hygiene products.

The waterless toilet systems of the present invention may be used in an outhouse or inside a residence, depending on household preference. Importantly, the waste is entirely contained within the bags inside the storage bin or holding tank and does not require a pit, such as with portable toilets of the prior art, or significant land space for plumbing for water-based disposal and treatment of the waste. The present invention is constructed and configured to be impervious to liquids, and thereby to prevent contamination of surfaces within the storage bin or container or holding tank. Preferably, the use of hard plastic or metal for the sitting unit, bag dispensing unit, and storage bin or holding tank, provides for cleaning and disinfection, as needed, in particular for the human contact surfaces.

The present invention may include a method for providing waterless sanitation comprising the step of providing a waterless toilet system including a top seating unit matingly connected to a bottom receiving container, the top seating unit further comprising a bag cartridge with a continuous plastic tube that feeds into a mechanical sealing mechanism. The method may further include the steps of: advancing the continuous plastic tube; activating the mechanical sealing mechanism to seal a first end of the plastic tube to form a bag; filling the bag with waste; activating the mechanical sealing mechanism to completely enclose the waste within the plastic by sealing a second end; advancing the filled bag downwardly into the bottom receiving container. This method may further include the step of activating the mechanical sealing mechanism and advancing the filled bag with a spring-loaded foot pedal, thereby providing a waterless faux-flushing action.

This invention may include a system for providing waterless sanitation comprising a waterless toilet comprising a top seating unit matingly connected to a bottom receiving container, the top seating unit further comprising a bag cartridge including a continuous plastic tube that feeds into a mechanical sealing mechanism. The mechanical sealing mechanism is operable for completely sealing a waste-filled portion of the continuous plastic tube to form a sealed bag, and advancing the sealed bag into the bottom receiving container, thereby providing a sanitary, waterless waste disposal system. Furthermore, the continuous plastic tube may further include an anti-microbial material for decontaminating waste. The system may further including a spring-loaded foot pedal to activate the mechanical sealing mechanism and/or to advance the waste-filled portion and sealed bag to create a faux-flushing action. The top seating unit may further include a lid pivotally connected to a seat, wherein the seat includes an opening for waste to be deposited. The bag cartridge may be removably connected to the top seating unit. The top seating unit and the bottom receiving container may be formed of a hard plastic material. The mechanical sealing mechanism may further include four interactive gears connected by sealing rods that cooperate to cinch and to seal the continuous tubing to form sealed waste-filled bags when activated.

The present invention may include a method for providing waterless sanitation, comprising the first step of providing a waterless toilet system comprising a bottom receiving container and a top seating unit, the top seating unit further including a bag cartridge, a plastic tube including a first end, and a mechanical sealing mechanism. The plastic tube is housed within the bag cartridge and the first end is positioned for advancement from the bag cartridge, and, further, the top seating unit is positioned above the bottom receiving unit and edges of the top seating unit and bottom receiving container are connected to form a seal. The subsequent steps include: advancing the first end of the plastic tube from the bag cartridge to the mechanical sealing mechanism; activating the mechanical sealing mechanism, thereby sealing the first end of the plastic tube to form an open bag; filling the open bag with waste; activating the mechanical sealing mechanism, thereby creating a second seal in the plastic tube to enclose the waste within a sealed bag; and advancing the sealed bag downwardly into the bottom receiving container. Alternatively, the step of activating the mechanical sealing mechanism may additionally include depressing a spring-loaded foot pedal.

The present invention may include a system for providing waterless sanitation with a waterless toilet is comprised of a bottom receiving container a top seating unit, the top seating unit including a bag cartridge, a plastic tube including a first end, and a mechanical sealing mechanism. The plastic tube is housed within the bag cartridge and the first end is positioned for advancement from the bag cartridge. Furthermore, the top seating unit is positioned above the bottom receiving unit and edges of the top seating unit and bottom receiving container are connected to form a seal. The mechanical sealing mechanism is operable to completely seal a waste-filled portion of the plastic tube, thereby creating a sealed bag and is further operable to advance the sealed bag into the bottom receiving container. The plastic tube may further include an anti-microbial material for waste decontamination. The system may further include a spring-loaded foot pedal configured to activate the mechanical sealing mechanism and/or advance the sealed bag. The top seating unit may further include a lid pivotally connected to a seat, wherein the seat includes an opening for waste to be deposited. The bag cartridge may additionally be removably connected to the top seating unit. The top seating unit and the bottom receiving container may be formed of a hard plastic material. The mechanical sealing mechanism may further include four interactive gears connected by sealing rods that cooperate to cinch and to seal the plastic tubing to form the filled bags upon activation.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention and the claims.

The invention claimed is:

1. A method for providing waterless sanitation comprising the steps of:
   a. providing a waterless toilet system comprising a top seating unit matingly connected to a bottom receiving container, the top seating unit further comprising a bag cartridge with a continuous plastic tube that feeds into a mechanical sealing mechanism, the plastic tube having adhesive dots about 12 inches apart on the horizontal and perforations such that when sealed after use, the tube tears along a sealed perforation;
   b. advancing the continuous plastic tube;
   c. activating the mechanical sealing mechanism to seal a first end of the plastic tube to form a bag;
   d. filling the bag with waste;
   e. activating the mechanical sealing mechanism to completely enclose the waste within the bag by sealing a second end of the bag;
   f. advancing the filled bag downwardly into the bottom receiving container and advancing the continuous plastic tube;
   g. the sealed, filled bag tearing along the perforation and dropping into the bottom receiving container.

2. The method of claim 1, further including the step of activating the mechanical sealing mechanism and advancing the filled bag with a spring-loaded foot pedal, thereby providing a waterless faux-flushing action.

3. A system for providing waterless sanitation comprising a waterless toilet comprising: a top seating unit matingly connected to a bottom receiving container, the top seating unit further comprising a bag cartridge including a continuous plastic tube that feeds into a mechanical sealing mechanism, the plastic tube having adhesive dots about 12 inches apart on the horizontal; wherein the mechanical sealing mechanism is operable for completely sealing a waste-filled portion of the continuous plastic tube to form a sealed bag, perforating the tube at the seal such that the tube tears along the sealed perforation, and advancing the sealed bag into the bottom receiving container, thereby providing a sanitary, waterless waste disposal system.

4. The system of claim 3, wherein the continuous plastic tube further includes an anti-microbial material for decontaminating waste.

5. The system of claim 3, further including a spring-loaded foot pedal to activate the mechanical sealing mechanism.

6. The system of claim 3, further including a spring-loaded foot pedal to activate the mechanical sealing mechanism and to advance the waste-filled portion and sealed bag to create a faux-flushing action.

7. The system of claim 3, the top seating unit further including a lid pivotally connected to a seat, wherein the seat includes an opening for waste to be deposited.

8. The system of claim 3, wherein the bag cartridge is removably connected to the top seating unit.

9. The system of claim 3, wherein the top seating unit and the bottom receiving container are formed of a hard plastic material.

10. The system of claim 3, wherein the mechanical sealing mechanism further includes four interactive gears connected by sealing rods that cooperate to cinch and to seal the continuous tubing to form sealed waste-filled bags when activated.

* * * * *